(12) United States Patent
Serkh

(10) Patent No.: US 6,306,055 B1
(45) Date of Patent: Oct. 23, 2001

(54) MULTI-RIBBED CVT BELT

(75) Inventor: Alexander Serkh, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/510,683

(22) Filed: Feb. 22, 2000

(51) Int. Cl.[7] .................................................. F16G 5/16
(52) U.S. Cl. ......................... 474/242; 474/201; 474/244
(58) Field of Search ................................... 474/201, 202, 474/242, 244, 245, 248

(56) References Cited

U.S. PATENT DOCUMENTS

| | | | |
|---|---|---|---|
| 4,281,483 | * | 8/1981 | Horowitz et al. ........................ 51/328 |
| 4,427,401 | * | 1/1984 | Hendriks et al. ...................... 474/201 |
| 4,484,903 | * | 11/1984 | Schneider ............................. 474/242 |
| 4,526,559 | * | 7/1985 | Smirl .................................... 474/201 |
| 4,533,342 | | 8/1985 | Miranti, Jr. et al. .................. 474/201 |
| 4,610,648 | | 9/1986 | Miranti, Jr. ........................... 474/242 |
| 4,617,007 | | 10/1986 | Miranti, Jr. et al. .................. 474/201 |
| 4,650,442 | | 3/1987 | Parsons .................................. 474/29 |
| 4,676,768 | | 6/1987 | Miranti et al. ........................ 474/201 |
| 4,820,248 | | 4/1989 | Parsons ................................. 474/268 |
| 4,913,690 | * | 4/1990 | Di Giacomo et al. ................ 474/250 |
| 5,123,880 | * | 6/1992 | Sekine et al. ......................... 474/244 |
| 5,147,253 | | 9/1992 | Douhairet et al. .................... 474/242 |
| 5,171,189 | | 12/1992 | Douhairet et al. .................... 474/144 |
| 5,242,332 | * | 9/1993 | Douhairet et al. .................... 474/146 |
| 5,263,904 | | 11/1993 | Van Liempd ......................... 474/242 |
| 5,961,417 | | 10/1999 | Schneider et al. ...................... 476/53 |
| 6,106,422 | * | 8/2000 | Arai ...................................... 474/100 |

\* cited by examiner

*Primary Examiner*—David A. Bucci
*Assistant Examiner*—Vicky A. Johnson
(74) *Attorney, Agent, or Firm*—J. A. Thurnau, Esq.; C. H. Castleman, Esq.; S. G. Austin, Esq.

(57) ABSTRACT

The invention comprises a plurality of clips arranged about a tensile member or core belt. The tensile member comprises a multi-ribbed belt. The multi-ribbed belt may comprise any standard multi-ribbed belt readily available in the art. The clips are generally u-shaped and have opposing inclined sides that cooperate with the sides of a CVT pulley. The opposing inclined sides of each clip can have a thermoset, thermoplastic or phenolic coating to provide a predetermined coefficient of friction. Each clip has a multi-ribbed profile bearing surface that cooperates with the multi-ribbed portion of the core belt. The clips are held in proper orientation to the multi-ribbed belt by elastomeric bands. The elastomeric bands are routed through a slot in each clip which then compresses the clips together.

6 Claims, 3 Drawing Sheets

MULTI-RIBBED CVT BELT

FIELD OF THE INVENTION

This invention relates to belts used in continuously variable transmissions ("CVT"), and more particularly to side drive CVT belts having an endless member comprising a multi-ribbed belt.

BACKGROUND OF THE INVENTION

It is well known in the art that a gear type transmission may be used for running a motor vehicle, motorcycle or the like. However, gear type transmissions have a fixed number of gears. They are generally designed to operate most efficiently in one of the gears, leaving the others to cause the engine to run at less efficient operating points. Consequently, for the purpose of improving efficiency a continuously variable transmission, CVT, is preferable. Various types of belts have been developed for use in continuously variable transmissions.

Generally, the CVT belts have a silhouette similar to that of a conventional V-belt. In particular, they are broad at the top and narrow at the bottom and designed to fit between the sheaves of a pulley, the pulley defining an angular groove. The pulley on which the belt is trained comprises a moveable sheave and a fixed sheave, both having a truncated cone shape. Generally, one of the sheaves moves while the other remains fixed.

Moving one sheave in relation to the other effectively varies the effective diameter φ of the pulley within which the belt operates. Consequently, belt speed is a function of the effective diameter of the pulley, which is in turn a function of the axial position of the sheaves relative to each other.

CVT belts in the prior art include belts comprising a plurality of blocks mounted transversely on a tensile member as well as monolithic metal belts. Certain forms of cog type belts are also known.

Representative of the art is the belt disclosed in U.S. Pat. No. 5,147,253 to Douhairet et al. Disclosed is a CVT belt comprising a plurality of transverse links arranged about an endless core. The endless core comprises a v belt. The v belt has oblique walls in contact with the interior surfaces of the links. The exterior oblique surfaces of the links are in contact with the flanges of the transmission pulleys. This device is only suitable for use with v belts, which have relatively low power transmission capabilities. Further, each link is constructed such that the v belt does not bear on the bottom of each link. Therefore, the v belt will be pressed into the bottom of the link when the belt is under load. This will change the pitch line diameter of the belt, resulting in an improper fit between the belt and the pulley and premature failure.

Also representative of the art is U.S. Pat. No. 5,242,332 to Douhairet et al. Disclosed is a CVT belt comprising a plurality of transverse links arranged about an endless core. Each link includes a strap, thereby making each link closeable as a means for connecting a link to the endless core. The strap is a cumbersome addition to the belt which adds weight. Weight serves to limit the operational limits of the belt. The endless core comprises a v belt. The v belt has oblique walls in contact with the interior surfaces of the links. The exterior oblique surfaces of the links are in contact with the flanges of the transmission pulleys.

In the prior art belts, the core member belt is captive within the clips or blocks so it cannot be replaced in the event of wear or failure. The core member belt is an integral part of the belt. Core failure obliges the user to replace the entire belt.

What is needed is a multi-ribbed CVT belt having a multi-ribbed belt core. What is needed is a multi-ribbed CVT belt having a plurality of cooperating transverse clips that have a conjugate shaped surface to engage the multi-ribbed core. What is needed is a multi-ribbed CVT belt having plastic transverse clips. What is needed is a multi-ribbed CVT belt having metal overmolded transverse clips. What is needed is a multi-ribbed CVT belt having a core member comprising a readily available belt. What is needed is a multi-ribbed CVT belt having a core belt that is easily replaced. The present invention meets these needs.

SUMMARY OF THE INVENTION

The primary aspect of the invention is to provide a multi-ribbed CVT belt having a multi-ribbed belt core.

Another aspect of the invention is to provide a multi-ribbed CVT belt having a plurality of cooperating transverse clips that have a conjugate shape to engage the multi-ribbed core.

Another aspect of the invention is to provide a multi-ribbed CVT belt having plastic transverse clips.

Another aspect of the invention is to provide a multi-ribbed CVT belt having metal overmolded transverse clips.

Another aspect of the invention is to provide a multi-ribbed CVT belt having a core member comprising a readily available belt.

Another aspect of the invention is to provide a multi-ribbed CVT belt having a core belt that is easily replaced.

Other aspects of the invention will be pointed out or made clear by the following description of the invention and the accompanying drawings.

The invention comprises a plurality of clips arranged about a core tensile member. The core tensile member comprises a multi-ribbed belt. The multi-ribbed belt may comprise any standard multi-ribbed belt readily available in the art. The clips are generally u-shaped and have opposing inclined sides that cooperate with the sides of a pulley. Each clip has a medially located multi-ribbed profile surface that cooperates with the multi-ribbed portion of the belt. The opposing inclined sides of each clip can have a non-metallic coating to provide a predetermined coefficient of friction. The clips are held in engagement with the multi-ribbed belt by elastomeric bands. The elastomeric bands are routed through a slot on either side of the belt in each clip, which then holds the clips together.

DETAILED DESCRIPTION OF THE PREFERRED EMBODIMENT

Figure 1:
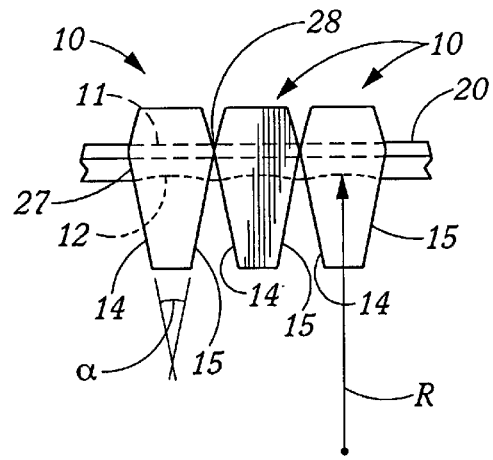
FIG. 1 is a side elevation view of a segment of the invention.
Figure 2:
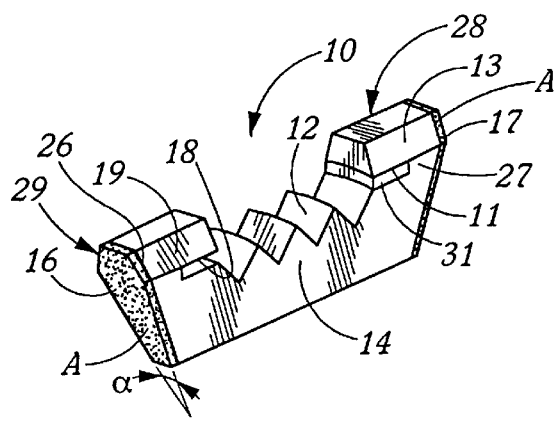
FIG. 2 is a top perspective view of a clip.

FIG. 1 is a side elevation view of a segment of the invention. FIG. 2 is a top perspective view of a clip. Clips 10 are arranged adjacent to each other and transverse to a major axis of a flexible core tensile member or belt 20. Belt 20 may comprise any multi-ribbed belt available in the power transmission art. Clips 10 generally describe a "U" shape. Each clip 10 comprises opposing slots 11 and 18. Between slots 11, 18 and within the "U" shaped section of clip 10 is bearing, or inner, surface 12. In the preferred embodiment surface 12 describes the surface upon which belt 20 bears. In the preferred embodiment a multi-ribbed profile is described for belt 20, see FIG. 3. Belt 20 may also comprise a synchronous belt having a synchronous belt profile or a v-belt having a v belt profile.

Lower bearing surface 12 also comprises a curve having a radius R when viewed in profile from a side of clip 10. The center of curvature or origin of R may be at the center of rotation of a pulley in which the belt is trained, or the center of rotation of the belt. Radius R is selected so that when the pulley is operated in the maximum under-drive condition (minimum operating radius for the belt on the pulley), R is equal to such minimum operating radius. This condition represents a high stress condition for belt 20. Consequently, lower bearing surface 12 provides a continuous curved surface for the core member belt to bear upon. This in turn extends the life of the belt 20 and hence the life of the CVT belt.

Sides 14 and 15 of clip 10 are inclined at angle α to each other. Angle α is set to allow side 14 to fully bear upon adjacent side 15 when the CVT belt is being operated in the maximum under-drive condition. This is then a function of the diameter of the pulleys in which the belt is trained. Further, since the elastomeric bands hold the clips in the proper belt configuration, see FIG. 3, it can be understood that each clip is held in place between its neighboring clips by the tension of the elastomeric bands. In the maximum under-drive condition, clips 10 bear on each other through shoulders 27, 28 and 26, 29 and sides 14, 15. In other than the maximum under-drive condition, each clip 10 bears upon and pivots on shoulders 26, 27 and 28, 29.

Clips 10 may comprise any metallic material, or comprise a metallic material core over-molded with a non-metallic material such as thermoset, thermoplastic or other composite material known in the art. The metallic material may comprise any high strength, light weight material, for example but not by way of limitation, alloys of steel, aluminum or titanium. Clip 10 may also comprise a non-metallic material such as thermoset, thermoplastic, composite or phenolic resin, each available in the art.

FIG. 2 is a top perspective view of a clip. Clip 10 comprises upper arms 13, 19 that further describe slots 11, 18. Slots 11 and 18 are used to retain elastomeric bands 22 and 31 within the clips, or in the alternative, provide the means by which the clips are attached to the elastomeric bands. Side 14 and side 15 (not shown) are at angle α to each other. Opposing inclined surfaces 16 and 17 engage the sides of a pulley. Bearing surface 12 is shown with a multi-ribbed profile which engages a like surface on a multi-ribbed core member belt or tensile member. Inclined surfaces 16 and 17 may be coated with material A, comprising either a metallic material or a non-metallic material such as thermoset, thermoplastic, composite or phenolic resin material, each having a predetermined coefficient of friction.

Figure 3:
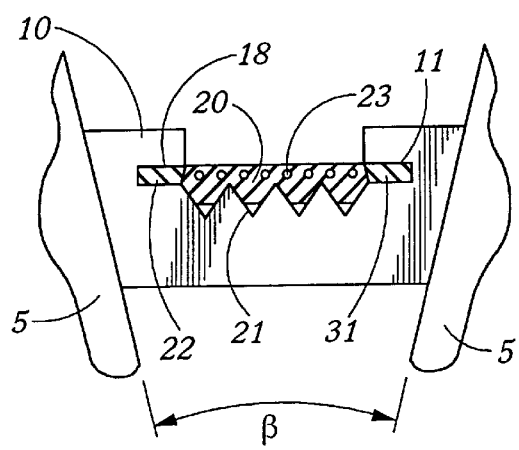
FIG. 3 is a front cross-sectional view of a clip in a pulley.

FIG. 3 is a front cross-sectional view of a clip in a pulley. Endless elastomeric bands 22 and 31 are shown engaged in slots 11, 18 respectively. In the preferred embodiment, clips 10 are transversely engaged with the belt 20. Clips 10 are not mechanically fastened to the core member belt 20, although belt 20 bears upon surface 12 of each clip 10. Clips 10 are retained in a proper belt configuration by the elastomeric bands 22, 31. Belt 20 is shown properly engaged within clip 10. Surface 21 of multi-ribbed belt 20 bears upon surface 12 of clip 10. Belt 20 may also further comprise tensile members 23 that run lengthwise within the belt body. Angle β between inclined surfaces 16, 17 cooperates with the included angle of the pulley sides 5 in which the belt is trained during operation. The entire face of each of inclined surfaces 16, 17 bears upon the pulley sides 5, since it is through inclined surfaces 16, 17 that the compressive or axial load and power is transmitted from the pulley sides to the belt.

Figure 4A:
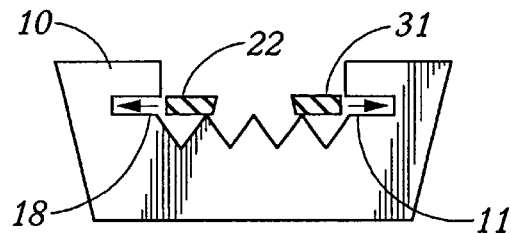
FIGS. 4(a), 4(b), 4(c), are 4(d) are a schematic of the belt assembly process.
Figure 4B:
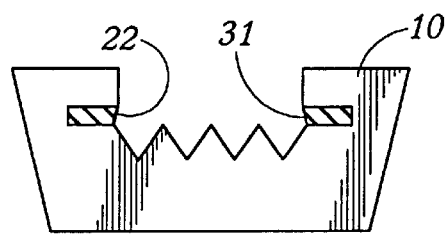
Figure 4C:
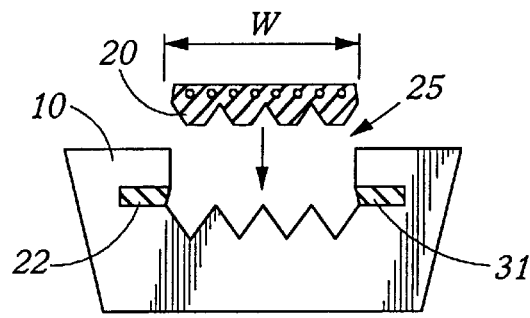
Figure 4D:
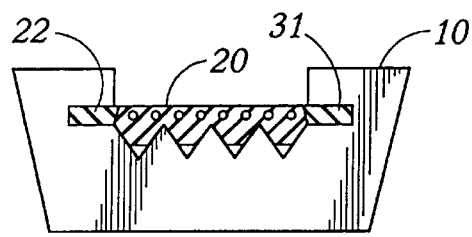

FIGS. 4(a), 4(b), 4(c), are 4(d) are a schematic of the belt assembly process. in FIG. 4(a), elastomeric bands 31, 22 are shown being inserted into slots 11, 18 respectively. In the next step FIG. 4(b), the elastomeric bands are shown seated in the slots. In FIG. 4(c) the endless member or belt 20 is inserted into the clip 10 through the top gap 25. During assembly the belt, which is held in shape by the elastomeric bands, may be pressed into a serpentine shape to allow the belt 20 to be placed over and ultimately into gaps 25. FIG. 4(d) shows belt 20 in the assembled configuration with the elastomeric bands 22, 31 in the clip 10 on either side of belt 20. In the preferred embodiment core member belt 20 is of a width, w, so that each side of the belt 20 bears against a respective side of elastomeric bands 22, 31 thereby retaining the elastomeric bands 22, 31 in their respective slots 18, 11.

Figure 5A:
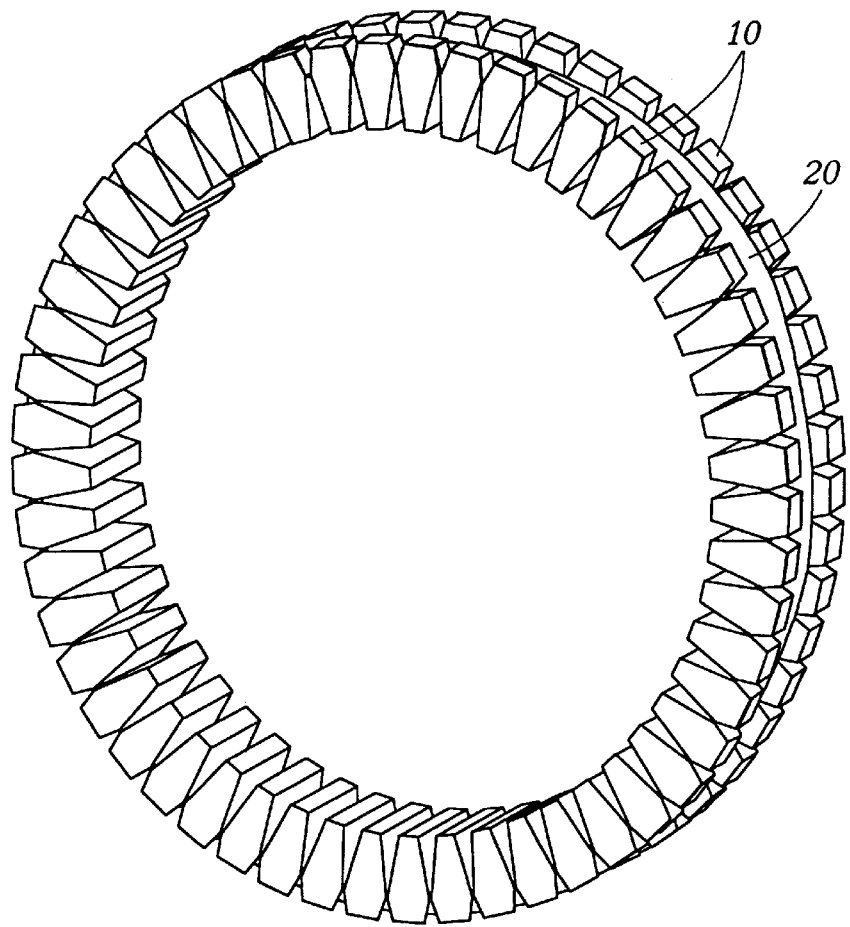
FIG. 5 is a perspective view of the invention.
Figure 5B:
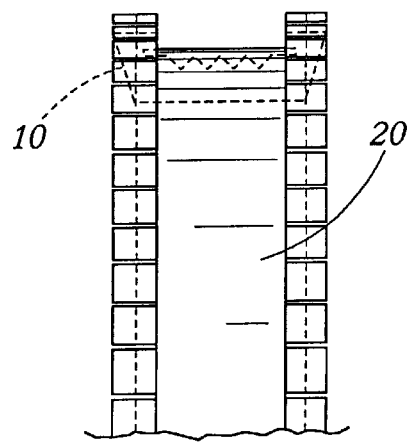

FIG. 5 is a perspective view of the invention. In FIG. 5a, depicting a fully assembled invention, clips 10 are shown engaged about the belt 20. In FIG. 5b, a clip 10 is shown in cross-section depicting its relation to a major axis A of the belt 20.

It should be noted that the core member belt 20 can be any one of the several belts available in the art. It is only limited in form so that it properly cooperates with the shape and form of the bearing surface 12. This can include multi-ribbed profiles, as well as a toothed profile, v-belt profile, or flat profile. When the core member belt 20 wears out, the old core belt 20 is simply removed and replaced with a new one.

Although a single form of the invention has been described herein, it will be obvious to those skilled in the art that variations may be made in the construction and relation of parts without departing from the spirit and scope of the invention.

I claim:
1. A belt comprising:
   an endless tensile member having an inner surface, said inner surface describing an inner surface profile;
   a plurality of clips each having a bearing surface, said bearing surface having a profile for engaging said inner surface profile;
   each of said clips further comprising at least one slot on either side of said bearing surface;
   each of said clips transversely engaging said endless tensile member;
   an endless elastomeric member engaging each slot in each clip whereby said clips are retained in engagement with each other; and
   said clips having opposing inclined surfaces for engaging a pulley.
2. The belt as in claim 1, wherein:
   said inner surface profile comprises a multi-ribbed profile; and
   said bearing surface describing a profile that cooperatively engages said multi-ribbed profile.
3. The belt as in claim 1, wherein said inclined surfaces comprise non-metallic material.
4. The belt as in claim 1, wherein:
   said inner surface profile comprises a toothed profile; and
   said bearing surface describes a profile that cooperatively engages said toothed profile.
5. The belt as in claim 1, wherein said bearing surface further comprises a curve having a radius and having a center of curvature located on an axis of rotation of a pulley.
6. The belt as in claim 5, wherein said radius further comprises a constant radius.

* * * * *

UNITED STATES PATENT AND TRADEMARK OFFICE
CERTIFICATE OF CORRECTION

PATENT NO. : 6,306,055 B1
DATED : October 23, 2001
INVENTOR(S) : Alexander Serkh It is certified that error appears in the above-identified patent and that said Letters Patent is hereby corrected as shown below:

<u>Title page,</u>
Item [75], Inventor, should read as follows:

-- [75] Inventor: Alexander Serkh, Troy, MI (US) --.

Signed and Sealed this

Fifteenth Day of April, 2003

JAMES E. ROGAN
*Director of the United States Patent and Trademark Office*